United States Patent [19]
Shenoy

[11] Patent Number: 4,723,795
[45] Date of Patent: Feb. 9, 1988

[54] INSTRUMENT PENETRATION FOR HIGH PRESSURE VESSELS

[75] Inventor: Divakar S. Shenoy, Windsor, Conn.

[73] Assignee: Combustion Engineering, Inc., Windsor, Conn.

[21] Appl. No.: 859,648

[22] Filed: May 5, 1986

[51] Int. Cl.[4] ............................................. F16L 19/00
[52] U.S. Cl. ................................... 285/138; 285/357; 285/353; 285/348
[58] Field of Search ............... 285/138, 141, 139, 202, 285/207, 215, 353, 354, 357, 356, 384, 330, 348, 171, 172

[56] References Cited

U.S. PATENT DOCUMENTS

| | | | |
|---|---|---|---|
| 1,815,046 | 7/1931 | Burr et al. | 285/215 |
| 1,825,443 | 9/1931 | Chormann et al. | 285/207 |
| 2,127,592 | 8/1938 | Ford | 285/138 |
| 2,467,312 | 4/1949 | Jack | 285/356 |
| 2,677,557 | 5/1954 | Worel | 285/356 |
| 2,832,615 | 4/1958 | Summers | 285/356 |
| 2,926,935 | 3/1960 | La Marre | 285/215 |
| 4,183,560 | 1/1980 | Wyss | 285/348 |

FOREIGN PATENT DOCUMENTS 13935 of 1909 United Kingdom ............... 285/215

Primary Examiner—Cornelius J. Husar
Assistant Examiner—Eric K. Nicholson
Attorney, Agent, or Firm—Chilton, Alix & Van Kirk

[57] ABSTRACT

A connector assembly and an installation method therefor provides a fluid-tight joint between a nozzle and a column concentrically supported within the nozzle. An annular seal assembly is disposed above a flange formed on the interior of the nozzle. A spacer sleeve is threaded to the nozzle for engagement with a ledge formed on the column. A clamp assembly is mounted to the column at a fixed position and includes means for raising the column in relation to the nozzle to fix the axial position of the column. A nut threaded to the column is rotatable for forcing a drive sleeve into compressive engagement with the seal assembly to produce a fluid-tight seal between the column and the nozzle.

20 Claims, 8 Drawing Figures

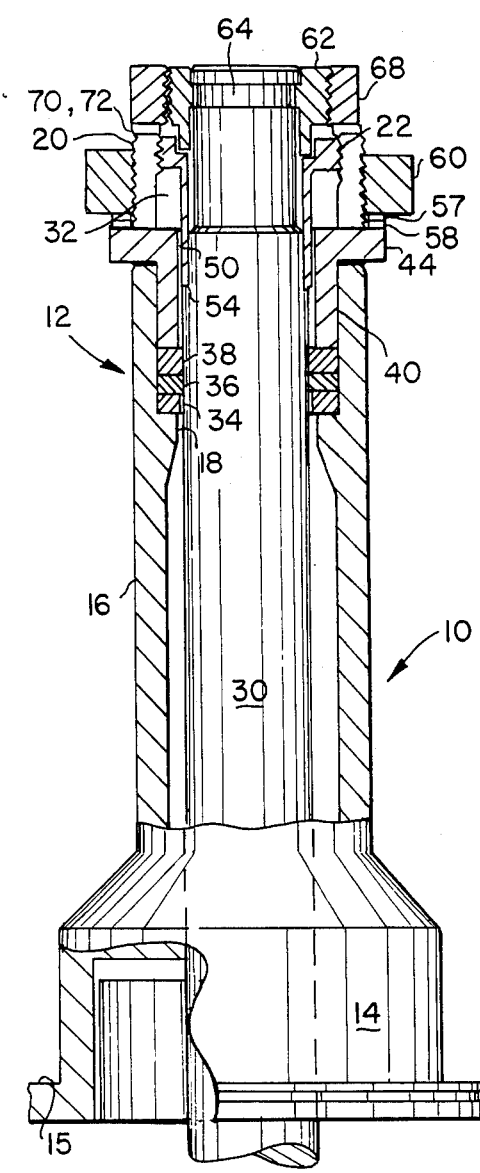
FIG. 1
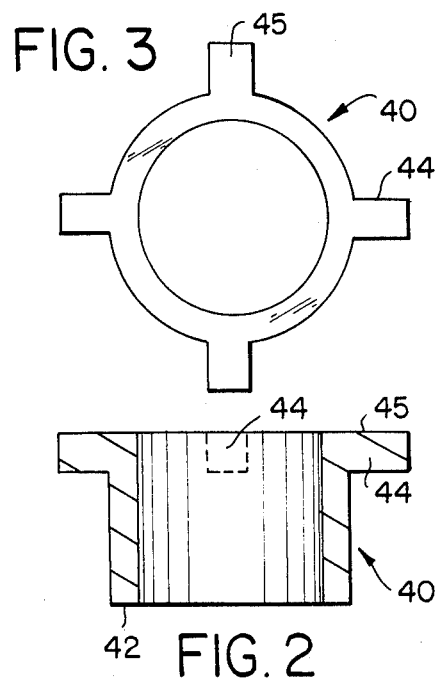
FIG. 3
FIG. 2
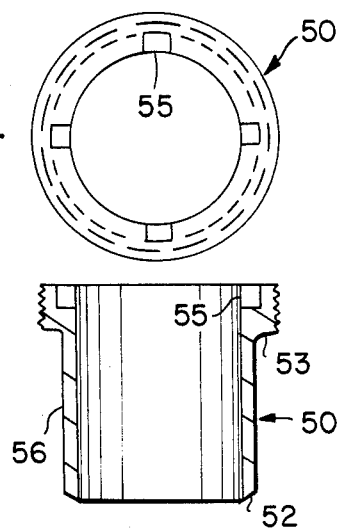
FIG. 4
FIG. 5

INSTRUMENT PENETRATION FOR HIGH PRESSURE VESSELS

BACKGROUND OF THE INVENTION

1. Field of the Invention

This invention relates generally to methods of and apparatus for providing communication between different pressure environments. More particularly, this invention relates to the establishment of fluid-tight connections between concentric tubes or the like which provide access to the interior of a pressure vessel. Accordingly, the general objects of the present invention are to provide novel and improved apparatus and methods of such character.

2. Brief Description of the Prior Art

In numerous industrial applications, particularly in nuclear power related technology, penetrations are required into large vessels within which processes occur at high pressures. For example, in a nuclear reactor vessel, penetrations are necessary to provide openings through which control rods or instrumentation may be inserted into the reactor core. These penetrations typically comprise "nozzles" which are welded to the reactor pressure vessel wall to provide support structures on which equipment associated with manipulation of the control rods or instruments may be mounted.

In many applications, a separate column or guide conduit is situated concentrically within the nozzle structure. The separate column or conduit is attached internally to the nozzle or to other structure within the vessel. Equipment mounted on or in the column must occasionally be removed for maintenance or repair and thus the ability to disassemble the column from the nozzle is required. However, during normal operation, a fluid-tight closure or connection must be provided between the nozzle and the concentrically received column to prevent leakage of radioactive or otherwise environmentally disruptive fluid from within the vessel.

In one known method for connecting and sealing a column to a nozzle of a reactor vessel, metal to metal seals are actuated by "Marman" clamps (a product of the Aeroquip Corporation of Los Angeles, Calif.). Typically, in this prior method a hydraulic tool is attached to a groove or other mounting means in the nozzle or to an adaptor member on the nozzle for seating the seals. After the seals are seated, the "Marman" clamp halves are bolted together to maintain the seal in a compressed state. The hydraulic tool is then removed and an autoclave-type metal seal is compressed by torquing several jacking screws around the perimeter of the nozzle. This latter technique has the disadvantages of being relatively time-consuming, which can be a very important consideration where the potential for exposure to radioactivity is present, and of requiring the maintenance of relatively close manufacturing tolerances.

In U.S. Application Ser. No. 609,919, now U.S. Pat. No. 4,655,483, filed May 14, 1984, entitled "Boundary Seal for Pressure Penetration", the referenced application being assigned to the assignee of the present invention, a connector device provides a primary pressure boundary between a nozzle and a column concentrically disposed therein. The connector device includes a closure member for compressing a seal ring against the end of the nozzle. The closure member includes a hub portion which defines an annular space between the closure member and the column. Packings are inserted in this annular space and compressed by means of a drive unit which includes a drive sleeve and an actuator nut threaded to an upper portion of the sleeve. A split-ring type collar is clamped to the column to provide support for the column. Rotation of the actuator nut loads the column thus causing it to be longitudinally displaced relative to the closure member until a tight connection is made. Continued actuation of the nut advances the drive sleeve along the annular space to compress the gasket to thereby complete the fluid-tight connection. While the boundary seal of the referenced application can be installed in a relatively short time when compared to previous devices of like character, it nevertheless requires substantial effort to install the connector, particularly the collar clamp which has eight bolts to tighten. Further, this boundary seal assembly does not completely insure against the column assembly accidentally moving upwardly or downwardly during the assembly process.

SUMMARY OF THE INVENTION

The present invention overcomes the above-discussed and other deficiencies of the prior art and in so doing provides a fluid-tight connector device and a method of installation thereof which are particularly useful for providing a fluid-tight seal between concentric tubes and conduits or the like such as are associated with pressure vessel nozzle penetrations in nuclear power plants.

Briefly stated, the invention in a preferred form is an assembly which provides a fluid-tight connection between a nozzle and a concentric tubular column supported in the nozzle. The nozzle is provided with an interior flange while a ledge extends from the exterior of the column at a point which will be displaced from the nozzle flange when the column is disposed in the nozzle. A seal assembly, which preferably comprises an annular packing or sealing ring, is positioned on the flange and surrounds the column for establishing a seal between the nozzle and the column. A drive sleeve is received within the nozzle. The drive sleeve has a first end, which bears against the seal assembly, and a drive shoulder. A spacer sleeve is threadably received in the nozzle for axial positioning relative thereto. A first end of the spacer sleeve is configured for engagement with the column ledge. A clamp assembly is mounted to the column at a fixed axial position relative to a first end of the nozzle. The clamp assembly includes an adjustable means for axially displacing the column relative to the nozzle so that the column ledge firmly engages the lower end of the spacer sleeve to fix the axial position of the column relative to the nozzle. A drive means, which comprises a nut threaded to the nozzle, is engageable with the drive shoulder of the drive sleeve to axially force the drive sleeve first end toward the nozzle flange to compress the sealing assembly into sealing engagement with column and the nozzle to prevent fluid leakage therebetween.

Practice of the method of the invention enables the rapid establishment of a fluid-tight connection between a nozzle, which has an interior flange, and a column, which is concentrically supported within the nozzle. An annular seal assembly is positioned on an interior flange of the nozzle between the nozzle and the column. A drive sleeve is then inserted into the nozzle until a lower portion of the sleeve bears against the seal assembly. A spacer sleeve is threaded into the nozzle and positioned such that the lower portion thereof engages a ledge on the exterior of the column, the ledge being spaced from and typically above the nozzle flange. The column is raised to produce firm engagement between the spacer sleeve and the ledge. The drive sleeve is then forced against the seal assembly to compress the seal assembly into sealing engagement with the column and the nozzle. The column is preferably raised by mounting a clamp assembly to the column in fixed position relative to the nozzle end and rotating a nut threaded to the clamp assembly to increase the distance between the clamp assembly and the nozzle end.

BRIEF DESCRIPTION OF THE DRAWINGS

FIG. 1 is an assembly view of a first embodiment of the invention, partially in section and partly broken away, after installation to a core exit thermocouple nozzle of a nuclear reactor vessel;

FIG. 2 is an enlarged sectional view of a drive sleeve employed in the embodiment of FIG. 1;

FIG. 3 is a top plan view of the drive sleeve of FIG. 2;

FIG. 4 is a top plan view of a spacer sleeve employed in the embodiment of FIG. 1;

FIG. 5 is a cross-sectional side elevation view of the spacer sleeve of FIG. 4;

DETAILED DESCRIPTION OF THE DISCLOSED EMBODIMENTS

Figure 6:
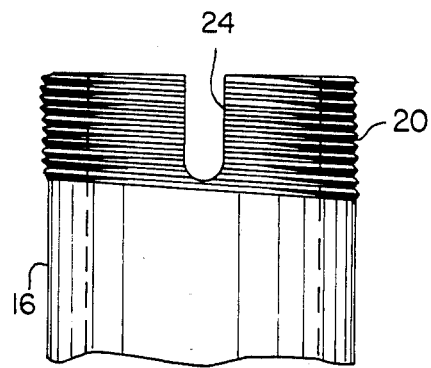
FIG. 6 is an enlarged fragmentary side elevational view of a portion of the apparatus of FIG. 1.
Figure 7:
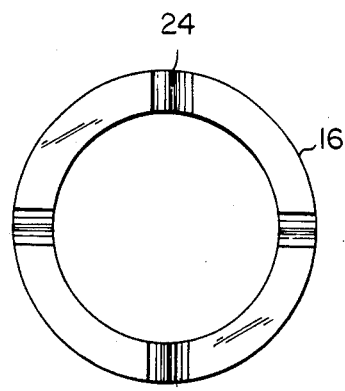
FIG. 7 is a top plan view of the apparatus of FIG. 6.

With reference to the drawing, wherein like numerals represent like parts throughout the several figures, a thermocouple nozzle penetration assembly is generally designated by the numeral 10 in FIG. 1. A pressure boundary connector device, which is depicted as fully installed to the thermocouple nozzle penetration assembly, is generally designated by the numeral 12. While the pressure boundary connector device and method of installation thereof in accordance with the present invention are described in connection with a nozzle penetration of a nuclear reactor vessel, it should be appreciated that other applications are within the scope of the present invention.

A nozzle adaptor 14 extends upwardly from the vessel wall 15 to form a generally cylindrical nozzle neck 16. For implementation of the present invention, nozzle neck 16 includes an internal circumferentially extending flange 18. Flange 18 may be either integrally formed in the nozzle neck or welded to the nozzle neck. The outer end of the nozzle neck is provided with an external threaded portion 20, as best illustrated in FIG. 6, and an internal threaded portion 22, as may be seen from FIG. 1. Referring again to FIG. 6, four equiangularly spaced slots 24 extend axially through the threaded portions at the end of neck 16.

A column 30 or similar tubular conduit is concentrically received and supported within the nozzle neck. The column 30 is ordinarily attached to a structure within the vessel but such attachment is not required for the practice of the present invention. The attachment structure will typically allow a limited degree of freedom which permits the column 30 to move in the axial direction of the nozzle, at least over a relatively short distance.

It will be appreciated that the bore of the nozzle neck 16 is directly exposed to the pressure of the process fluid within the vessel. The vessel pressure tends to urge the fluid upwardly in the annular space between the column 30 and the neck 16 of the nozzle. A primary objective of the present invention is to form a fluid-tight connection between the column 30 and the nozzle neck 16 to prevent the leakage of pressurized fluid to the environment via this annular space. In accordance with the invention, a primary pressure boundary connection is provided which typically will maintain sealing integrity against a vessel pressure of 2500 psi or more at a temperature of, for example, 600° F. within a high radiation field.

The inside, i.e., minimum, diameter of the nozzle flange 18 is greater than the outer diameter of the column 30 with the result that an annular cavity 32 is formed above the flange between the facing coaxial walls of the nozzle neck and the column. A sealing ring assembly comprising an annular spacer ring 34 and a pair of annular packings 36 and 38 is installed in the annular cavity 32 so that the ring 34 rests on flange 18. The packings 36 and 38 are preferably comprised of a graphite composition of the type commonly known as "Grafoil".

The connector of the present invention also includes a drive sleeve 40, as best illustrated in FIGS. 2 and 3, which has a lower end 42 and four outwardly projecting spline-like projections 44 at its upper end. The drive sleeve 40 is slidably received in the annular cavity 32 so that the end surface 42 engages the top of packing 38 with the projections 44 being received in cooperating slots 24 of the nozzle and extending radially therethrough. The spline-like projections 44 interact with the walls which define slots 24 to prevent the drive sleeve 40 from rotating relative to the nozzle. The projections 44 extend radially outwardly beyond the cylindrical surface of the nozzle to form four equiangularly spaced platforms 45.

The connector device also includes a spacer sleeve 50, depicted in FIGS. 4 and 5, which has a lower inwardly sloped engagement end or shoulder 52. Shoulder 52 is adapted to engage a complementary circumferentially extending ledge 54 provided on the exterior of the column 30. Column ledge 54 is formed in the column 30 above the elevation of nozzle flange 18 and the packings 36 and 38. The spacer sleeve 50 has a uniform inside diameter and an upper engagement boss 53 of enlarged diameter. The engagement boss 53 is externally threaded for engagement with the internal thread 22 on nozzle neck 16. The upper side of engagement boss 53 is provided with a plurality of spaced rectangular shaped notches 55. The inside diameter of the spacer sleeve is slightly greater than the outside diameter of the column 30 so that the spacer sleeve 50 may be installed around the column and threaded into the nozzle neck 52. The lower portion 56 of the spacer sleeve 50 has a uniform outside diameter which is less than the inside diameter of the drive sleeve 40. The lower portion 56 of the spacer sleeve and the drive sleeve 40 are interposed in concentric relationship to allow for independent axial positioning of the spacer sleeve and drive sleeve. Thrust washers 57 and a thrust bearing 58, which have an inside diameter greater than the outside diameter of the nozzle neck, are slipped around the nozzle end for seating against the platforms 45 of the projecting shoulders 44 of the drive sleeve. A nut 60 is engaged with the external thread 20 on the nozzle assembly and tightened against the top of upper thrust washer 57 to force the drive sleeve 40 downwardly so that the drive sleeve end surface 42 firmly engages the packing 38.

A collar 62, which is preferably in the form of a split-ring and which has a radially inwardly extending projection, engages a groove 64 in the exterior surface of the column. Groove 64 is axially spaced above the end of the nozzle neck. The split-ring collar 62 has an external threaded surface which receives a retaining nut 68. A combination of thrust washer and thrust bearing 70, 72 are interposed between the end of the nozzle assembly and a lower bearing surface of nut 68. A plurality of spaced legs project downwardly from the lower end of collar 62 and engage the notches 55 in boss 53 of spacer sleeve 50. When the nut 68 is tightened against the thrust bearing washer combination 70, 72 the column assembly is displaced vertically upwardly so that the column ledge 54 firmly engages the spacer sleeve shoulder 52 whereby the nozzle assembly and the column are essentially fixed in a rigid concentric axial relationship. Nut 60 is then tightened (downwardly threaded) to compress the packings 36 and 38 whereby the packings expand radially against the facing walls of the nozzle assembly and the column to thereby establish a fluid-tight seal.

Figure 8:
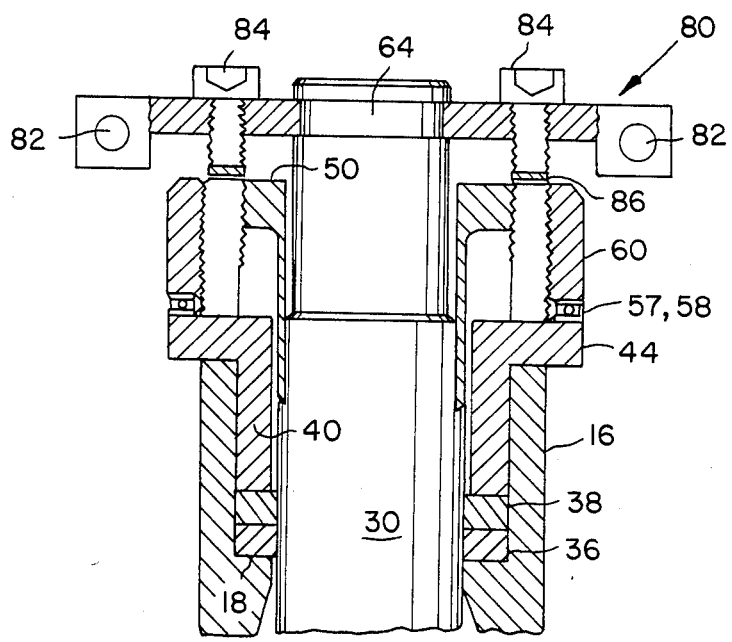
FIG. 8 is a sectional view illustrating an alternate embodiment of the invention.

In an alternate form of the invention, as illustrated in FIG. 8, a clamp set indicated generally at 80 includes a split collar which is mounted in groove 64 by means of a pair of bolts 82. A plurality of angularly spaced cap screws 84 are axially threaded through the clamp set. The upper ends of the cap screws 84 include hex sockets to permit torquing the screws. The lower ends of the screws are engageable, via a washer 68, with the end of the nozzle assembly. As the screws are tightened (downwardly driven), a force is delivered to the nozzle assembly to provide, via the spacer sleeve, a fixed rigid axial engagement between the concentric column and nozzle assembly.

It should be appreciated that the pressure boundary seal provided by the packings 36 and 38 of the present invention is not sensitive to surface imperfections. In addition, the connector assembly may be assembled and installed in a relatively short time thus minimizing the exposure to radioactivity of maintenance personnel. The use of the threaded spacer sleeve 50 for mounting engagement independently of the seal setting drive sleeve eliminates the need for obtaining accurate as-built dimensions. More importantly, a primary boundary pressure seal is effectively implemented even where conditions would tend to cause accidental upward or downward movement of the column assembly. The column assembly is essentially rigidly positioned in fixed relationship with the nozzle due to the cooperation of the clamp assembly and the spacer sleeve as previously described. It will further be appreciated that the assembly technique for implementing the pressure boundary seal does not require hydraulic tooling but merely a torque wrench.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A fluid-type connection between substantially concentric inner and outer tubular members comprising;
    flange means extending from the interior of said outer member;
    engagement means on the exterior of said inner member, said engagement means being axially displaced from said flange means;
    compressible seal means disposed at the same axial side of said flange means as said engagement means and surrounding said inner member for establishing a fluid-tight seal between said inner and outer members;
    drive sleeve means received by said outer member, said drive sleeve means having a first end which bears against said seal means, said drive sleeve means also having drive shoulder means displaced from said first end;
    spacer sleeve means received in said outer member and engageable with said outer member for axial positioning relative thereto, said spacer sleeve means defining a bearing surface at a first end thereof;
    clamp means coupled to said inner member at a fixed axial position thereof and having adjustable means for axially moving said inner member in a first direction relative to said outer member so that said engagement means firmly engages said spacer sleeve means bearing surface to fix the axial position of said inner member relative to said outer member; and
    driver means engageable with said drive shoulder means to axially force said drive sleeve means first end toward said flange means to compress said sealing means into sealing engagement with said inner and outer members to prevent fluid leakage therebetween.

2. The connection of claim 1 wherein the outer member is pressure vessel penetration nozzle having a plurality of angularly spaced elongated slots therein and wherein said drive shoulder means comprises plural radially extending projections on said drive sleeve means, said projections being received in said slots and extending radially beyond the outwardly facing surface of said nozzle to form engagement surfaces for engagement by said drive means.

3. The connection of claim 1 wherein the outer member is a pressure vessel penetration nozzle and wherein said spacer sleeve means comprises a sleeve which is threadably engageable with said nozzle, said spacer sleeve means including said bearing surface defining first end, said first end being concentrically interposed between said drive sleeve means and said inner member.

4. The connection of claim 1 wherein said outer member is a pressure vessel penetration nozzle and wherein said drive means comprises a nut threadably engageable with said nozzle, said nut being positioned in driving engagement with said drive shoulder means.

5. The connection of claim 1 wherein the outer member is a pressure vessel penetration nozzle and wherein said clamp means comprises a clamp assembly and the adjustable means comprises a nut threadably engageable with the clamp assembly for axial positioning relative to said inner member, said nozzle having an outer end and said nut being axially movable relative to said nozzle outer end to change the axial position of said inner member relative to said nozzle outer end upon advancement of said nut.

6. The connection of claim 1 wherein the seal means comprises an annular packing.

7. The connection of claim 6 wherein said packing is comprised of metal.

8. The connection of claim 6 wherein the seal means further comprises a second annular packing and a thrust ring.

9. The connection of claim 1 wherein the clamp means comprises a clamp assembly and the adjustable means comprises a plurality of angularly spaced axially extending screws threadably mounted to said assembly said screws developing a force which is transmitted to said outer member.

10. The connection of claim 2 wherein said spacer sleeve means comprises a sleeve which is threadably engageable with said nozzle, said spacer sleeve means sleeve including said bearing surface defining said first end, said first end being concentrically interposed between said drive sleeve means and said inner member.

11. The connection of claim 2 wherein said drive means comprises a nut threadably engageable with said nozzle for axial positioning therewith, said nut being positioned in drive engagement with said drive shoulder means.

12. The connection of claim 10 wherein said drive means comprises a nut threadably engageable with said nozzle for axial positioning therewith, said nut being positioned in drive engagement with said drive shoulder means.

13. The connection of claim 2 wherein said clamp means comprises a clamp assembly and the adjustable means comprises a nut threadably engageable with the clamp assembly, said nozzle having an outer end and the position of said nut relative to said nozzle outer end being adjustable to change the axial position of said inner member relative to said nozzle outer end upon advancement of said nut.

14. The connection of claim 3 wherein said clamp means comprises a clamp assembly and the adjustable means comprises a nut threadably engageable with the clamp assembly, said nozzle having an outer end and the position of said nut relative to said nozzle outer end being adjustable to change the axial position of said inner member relative to said nozzle outer end upon advancement of said nut.

15. The connection of claim 4 wherein said clamp means comprises a clamp assembly and the adjustable means comprises a nut threadably engageable with the clamp assembly, said nozzle having an outer end and the position of said nut relative to said nozzle outer end being adjustable to change the axial position of said inner member relative to said nozzle outer end upon advancement of said nut.

16. The connection of claim 10 wherein said clamp means comprises a clamp assembly and the adjustable means comprises a nut threadably engageable with the clamp assembly, said nozzle having an outer end and the position of said nut relative to said nozzle outer end being adjustable to change the axial position of said inner member relative to said nozzle outer end upon advancement of said nut.

17. The connection of claim 11 wherein said clamp means comprises a clamp assembly and the adjustable means comprises a nut threadably engageable with the clamp assembly, said nozzle having an outer end and the position of said nut relative to said nozzle outer end being adjustable to change the axial position of said inner member relative to said nozzle outer end upon advancement of said nut.

18. The connection of claim 12 wherein said clamp means comprises a clamp assembly and the adjustable means comprises a nut threadably engageable with the clamp assembly, said nozzle having an upper end and the position of said nut relative to said nozzle upper end being adjustable to change the axial position of said inner member relative to said nozzle upper end upon advancement of said nut.

19. A method for establishing a fluid-tight connection between a nozzle and a column concentrically supported within the nozzle, the nozzle having an outer end and an interior flange, the column extending axially outwardly beyond the outer end of the nozzle and having an exterior ledge axially spaced outwardly from the nozzle flange, said method comprising the steps of:
(a) installing a radially expandable annular seal assembly so that the seal assembly rests on the nozzle flange and is disposed between the nozzle and column;
(b) sliding a drive sleeve into the space between the column and the nozzle until a first end of the drive sleeve bears against the seal assembly;
(c) coupling a spacer sleeve to the nozzle and adjusting the position thereof such that the spacer sleeve engages the exterior ledge on the column;
(d) axially moving the column relative to the nozzle to establish firm engagement between the spacer sleeve and the column exterior ledge; and
(e) forcing the drive sleeve against the seal assembly to compress the seal assembly to cause radially expansion thereof into sealing engagement with the column and the nozzle.

20. The method of claim 19 wherein step (d) further comprises coupling a clamp assembly to the column in a fixed position located outwardly with respect to the nozzle outer end and causing the distance between the clamp assembly and the nozzle outer end to increase.

* * * * *

UNITED STATES PATENT AND TRADEMARK OFFICE
CERTIFICATE OF CORRECTION

PATENT NO. : 4,723,795
DATED : February 9, 1988
INVENTOR(S) : D.S. Shennoy

It is certified that error appears in the above-identified patent and that said Letters Patent is hereby corrected as shown below:

Column 2, line 53, change "drive" to --driver--.

Column 5, line 35, change "68" to --86--.

Claim 2, line 2, before "pressure", insert --a--.

Claim 2, line 9, change "drive" to --driver--.

Claim 4, line 3, change "drive" to --driver.

Claim 11, line 1, change "drive" to --driver--.

Claim 12, line 1, change "drive" to --driver--.

Signed and Sealed this

Twelfth Day of July, 1988

*Attest:*

DONALD J. QUIGG

*Attesting Officer*  *Commissioner of Patents and Trademarks*